US009767840B2

(12) United States Patent
Hendry (10) Patent No.: US 9,767,840 B2
(45) Date of Patent: Sep. 19, 2017

(54) SECURING PROTECTED CONTENT DURING VIDEO PLAYBACK (75) Inventor: Ian C. Hendry, San Jose, CA (US)

(73) Assignee: APPLE INC., Cupertino, CA (US)

( * ) Notice: Subject to any disclaimer, the term of this patent is extended or adjusted under 35 U.S.C. 154(b) by 278 days.

(21) Appl. No.: 13/212,821

(22) Filed: Aug. 18, 2011

(65) Prior Publication Data

US 2013/0044084 A1 Feb. 21, 2013

(51) Int. Cl.
*G06F 12/14* (2006.01)
*G11B 20/00* (2006.01)
(Continued)

(52) U.S. Cl.
CPC ........ *G11B 20/00463* (2013.01); *G06F 21/10* (2013.01); *G06F 21/84* (2013.01); *H04L 9/32* (2013.01); *G06T 1/0021* (2013.01); *G06T 2201/0053* (2013.01); *G06T 2201/0064* (2013.01); *H04N 7/16* (2013.01)

(58) Field of Classification Search
CPC ........ G06F 3/0484; G06F 21/84; G06F 12/14; G06F 21/10; G11B 20/00463; H04N 21/4405; H04N 21/4627; H04N 21/8358; H04N 7/16; G06T 1/0021; G06T 2201/0064; G06T 2201/0053; G09G 5/39; H04L 9/32; H04L 7/16
USPC ......... 345/204, 641; 380/279, 201; 709/219; 713/153, 176; 726/3, 4, 26, 32; 725/25, 725/31
See application file for complete search history.

(56) References Cited

U.S. PATENT DOCUMENTS 5,596,718 A * 1/1997 Boebert ................. G06F 21/42
713/150
5,943,065 A * 8/1999 Yassaie .................... G09G 5/14
345/546
(Continued)

FOREIGN PATENT DOCUMENTS

CN 101441694 A 5/2009
EP 1 924 095 A1 5/2008
(Continued)

OTHER PUBLICATIONS

Digital Content Protection LLC, "High-bandwidth Digital Content Protection System," Revision 1.3, Dec. 21, 2006, pp. 1-90 (XP007914503).
(Continued)

*Primary Examiner* — Michael J Eurice
(74) *Attorney, Agent, or Firm* — Baker Hostetler LLP; Robert L. Hails (57) ABSTRACT The disclosed embodiments provide a system that drives a display from a computer system. During operation, the system writes graphical output to protected memory and drives the display from the protected memory. If the graphical output lacks protection, the system discontinues the driving of the display from the protected memory. In particular, upon detecting a lack of protection in the graphical output, the system continues to drive the display from the protected memory during a grace period associated with the lack of protection in the graphical output. The system then discontinues driving of the display from the protected memory if protection of the graphical output does not resume during the grace period.

22 Claims, 4 Drawing Sheets (51) Int. Cl.
*H04L 9/32* (2006.01)
*G06F 21/10* (2013.01)
*G06F 21/84* (2013.01)
*H04N 7/16* (2011.01)
*G06T 1/00* (2006.01)

(56) References Cited

U.S. PATENT DOCUMENTS

| | | | | |
|---|---|---|---|---|
| 6,370,318 B1* | 4/2002 | Iwaki | H04N 5/913 | 380/203 |
| 6,621,496 B1* | 9/2003 | Ryan | G09G 5/39 | 345/533 |
| 6,948,070 B1* | 9/2005 | Ginter | G06F 21/10 | 348/E5.006 |
| 7,095,854 B1* | 8/2006 | Ginter | G06F 21/10 | 380/231 |
| 7,114,168 B1* | 9/2006 | Wyatt | H04N 5/765 | 725/31 |
| 8,037,178 B1* | 10/2011 | Agarwalla | G06F 9/5072 | 709/225 |
| 8,087,081 B1* | 12/2011 | Chun | H04L 67/101 | 726/22 |
| 8,605,097 B1* | 12/2013 | Wyatt | H04N 21/4122 | 345/501 |
| 8,646,052 B2 | 2/2014 | Vembu | G06F 21/606 | 713/164 |
| 9,223,994 B2* | 12/2015 | Leleu | G06F 21/36 | |
| 2002/0106082 A1* | 8/2002 | Kori | H04N 7/162 | 380/202 |
| 2002/0112171 A1* | 8/2002 | Ginter | G06F 21/10 | 713/185 |
| 2002/0163522 A1* | 11/2002 | Porter | G06F 12/1441 | 345/533 |
| 2003/0037330 A1* | 2/2003 | Makofka | H04N 5/783 | 725/32 |
| 2003/0135742 A1* | 7/2003 | Evans | G06F 21/84 | 713/189 |
| 2003/0179206 A1* | 9/2003 | Emerson | G06F 3/1454 | 345/501 |
| 2004/0194126 A1* | 9/2004 | Kogure | H04N 7/163 | 725/31 |
| 2005/0144468 A1* | 6/2005 | Northcutt | G06F 21/10 | 713/189 |
| 2005/0204163 A1* | 9/2005 | Alkove | G06F 21/10 | 726/5 |
| 2005/0235303 A1* | 10/2005 | Tabor | G11B 7/08582 | 720/676 |
| 2006/0021057 A1* | 1/2006 | Risan | G06F 21/10 | 726/26 |
| 2006/0031905 A1* | 2/2006 | Kwon | H04H 20/12 | 725/108 |
| 2006/0146057 A1* | 7/2006 | Blythe | G06F 9/45537 | 345/506 |
| 2006/0156009 A1* | 7/2006 | Shin | H04L 63/123 | 713/176 |
| 2006/0221067 A1* | 10/2006 | Kim | G06F 21/84 | 345/204 |
| 2007/0033419 A1* | 2/2007 | Kocher | G06F 21/10 | 713/193 |
| 2007/0100771 A1* | 5/2007 | Eckleder | G06F 21/10 | 705/67 |
| 2007/0279494 A1* | 12/2007 | Aman | G01S 3/7864 | 348/169 |
| 2008/0075429 A1 | 3/2008 | Egawa et al. | | |
| 2008/0133938 A1* | 6/2008 | Kocher | G11B 20/00086 | 713/193 |
| 2008/0148063 A1* | 6/2008 | Hanko | G06F 21/10 | 713/189 |
| 2008/0250239 A1* | 10/2008 | Risan | G06F 21/10 | 713/153 |
| 2009/0136041 A1* | 5/2009 | Tsu | G06F 21/84 | 380/278 |
| 2009/0245521 A1* | 10/2009 | Vembu | G06F 21/606 | 380/279 |
| 2009/0254965 A1* | 10/2009 | Smith | H04N 5/76 | 725/134 |
| 2010/0034379 A1* | 2/2010 | Nakane | G06F 21/10 | 380/236 |
| 2010/0119062 A1* | 5/2010 | Hopkins | G06F 11/006 | 380/44 |
| 2010/0153704 A1* | 6/2010 | Winslow | H04L 63/0428 | 713/153 |
| 2010/0220858 A1* | 9/2010 | Pan | G06T 1/0035 | 380/210 |
| 2010/0226526 A1* | 9/2010 | Modro | G06K 9/00577 | 382/100 |
| 2010/0306249 A1* | 12/2010 | Hill | G06F 17/30867 | 707/769 |
| 2011/0103472 A1* | 5/2011 | Lefebvre | H04N 21/4122 | 375/240.12 |
| 2011/0109792 A1* | 5/2011 | Montag | H04L 65/602 | 348/390.1 |
| 2011/0161667 A1* | 6/2011 | Poornachandran | G06F 21/84 | 713/168 |
| 2011/0231273 A1* | 9/2011 | Buchheit | G06Q 20/12 | 705/26.1 |
| 2011/0299680 A1* | 12/2011 | Vembu | H04N 21/4405 | 380/200 |
| 2012/0017235 A1* | 1/2012 | Kudelski | H04N 21/2541 | 725/31 |
| 2012/0079270 A1* | 3/2012 | Patel | G06F 21/10 | 713/165 |
| 2012/0079535 A1* | 3/2012 | Kivirauma | H04W 4/021 | 725/37 |
| 2013/0006866 A1* | 1/2013 | Pendakur | G06Q 30/0241 | 705/50 |
| 2013/0179685 A1* | 7/2013 | Weinstein | G06F 21/85 | 713/168 |
| 2014/0112471 A1* | 4/2014 | Pendakur | G06F 21/123 | 380/229 |
| 2014/0337558 A1* | 11/2014 | Powers | G06F 13/4072 | 710/313 |
| 2015/0297949 A1* | 10/2015 | Aman | G06T 7/2033 | 348/157 |
| 2015/0371053 A1* | 12/2015 | Welch | G06F 21/6218 | 726/30 |
| 2016/0180259 A1* | 6/2016 | Marianko | G06Q 10/02 | 705/5 |

FOREIGN PATENT DOCUMENTS

| | | |
|---|---|---|
| JP | 2003-289500 A | 10/2003 |
| JP | 2007-074112 A | 3/2007 |
| JP | 2007-318279 A | 12/2007 |
| JP | 2011-077640 A | 4/2011 |
| JP | 2011-087176 A | 4/2011 |
| JP | 2011-101430 A | 5/2011 |
| JP | 2011-135512 A | 7/2011 |

OTHER PUBLICATIONS

Digital Content Protection LLC, "High-bandwidth Digital Content Protection System," Revision 2.0, Content Protection for Next Generation Scenarios, Jan. 1, 2005, pp. 1-17 (XP007921133), Retrieved from Internet on Oct. 27, 2012.
International Search Report and Written Opinion dated Nov. 14, 2012, in PCT/US2012/051482, filed Aug. 17, 2012.
NEC Display Solutions, "HDMI and HDCP: Setting New Standards in Video-to-Display Transference," Internet Citation, 2007, pp. 1-3 (XP002674802) URL: http://www.necdisplay.com/Documents/WhitePapers/HDMI_HDCP.pdf; retrieved Apr. 25, 2012.
Zhao, J. et al., "On weakness of the HDCP authentication and key exchange protocol and its repair," Mathematical and Computer Modelling, Pergamon Press, Oxford GB, vol. 55, No. 1, Jan. 4, 2011, pp. 19-25 (XP028108932).
Japanese Office Action, dated Mar. 30, 2015, from corresponding Japanese Patent Application No. 2014-526263, filed Feb. 17, 2014.

(56) References Cited

OTHER PUBLICATIONS

Chinese Office Action, dated Nov. 3, 2015, from corresponding Chinese Patent Application No. 201280046584.5, filed Mar. 25, 2014.

* cited by examiner

SECURING PROTECTED CONTENT DURING VIDEO PLAYBACK

BACKGROUND

Field

The present embodiments relate to driving displays from a computer system. More specifically, the present embodiments relate to techniques for securing protected video content during video playback on the computer system.

Related Art

Interactions between a user and a computer system may be facilitated by connecting external displays to the computer system. For example, a laptop computer may include a standardized video interface such as Digital Visual Interface (DVI) or High-Definition Multimedia Interface (HDMI) that allows the laptop computer to be connected to displays with different resolutions, dimensions, pixel densities, and/or color profiles. In turn, the connection of an external display to the laptop computer may allow a user of the laptop computer to increase the amount of screen space available for viewing documents, media files (e.g., video, images, etc.), and/or graphical user interfaces (GUIs) for applications on the laptop computer.

Unfortunately, the driving of an external display from a computer system may be associated with a number of security vulnerabilities. In particular, video data used to drive the external display may be subject to eavesdropping as the video data is sent over a video interface to the external display. To protect the video data from eavesdropping, a protection mechanism such as High-bandwidth Digital Content Protection (HDCP) may be used to encrypt the video data before the video data is transmitted to the external display. However, an eavesdropper may bypass the protection mechanism by exploiting vulnerabilities in untrusted software on the computer system and/or lapses in the encryption of the video data.

Hence, what is needed is a mechanism for enforcing the protection of video data during the driving of an external display using the video data.

SUMMARY

The disclosed embodiments provide a system that drives a display from a computer system. During operation, the system writes graphical output to protected memory and drives the display from the protected memory. If the graphical output lacks protection, the system discontinues the driving of the display from the protected memory. In particular, upon detecting a lack of protection in the graphical output, the system continues to drive the display from the protected memory during a grace period associated with the lack of protection in the graphical output. The system then discontinues driving of the display from the protected memory if protection of the graphical output does not resume during the grace period. Note that the length of the grace period can be configurable and/or grace periods can be disabled, for example by using a fuse or a secure microprocessor. (Moreover, the terms "graphical output" and "display link" are used interchangeably through this specification and the appended claims. For example, this disclosure talks about protecting the "graphical output" or "display link" through some type of encryption. Also note that the terms "display link" and "graphical output" as used in this disclosure and appended claims are meant to encompass both traditional display transmitters, such as DisplayPort or HDMI, and also to cover wireless standards, for example where HDCP 2.x content is encrypted by a GPU and is written to memory a for subsequent transmission by a radio device.)

In some embodiments, the system continues driving the display from the protected memory independently of the protection of the graphical output if the display corresponds to an allowed unprotected display type (e.g., an internal display).

In some embodiments, the grace period corresponds to at least one of a period of time, a number of frames, and/or a number of symbols. (Note that in some cases, there may be no grace period. Moreover, the grace period may change for different scenarios. For example, the grace period for "turning on" may differ from the grace period for "losing HDCP".)

In some embodiments, discontinuing the driving of the display from the protected memory involves at least one of:
driving the display using substitute graphical output;
(ii) driving the display using the graphical output at a lower resolution; and
(iii) driving a different display using the graphical output.

In some embodiments, the substitute graphical output is at least one of a gray area and a message.

In some embodiments, the protection includes encryption of the graphical output. (In other embodiments, the system can use different forms of access control.)

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for driving a display from a computer system. The computer system may correspond to a laptop computer, personal computer, workstation, and/or portable electronic device. The display may be a cathode ray tube (CRT) display, liquid crystal display (LCD), plasma display, organic light-emitting diode (OLED) display, surface-conducting electron-emitter display (SED), and/or other type of electronic display.

More specifically, the disclosed embodiments provide a method and system for securing graphical output used to drive the display, such as graphical output generated from a copyrighted video file. The graphical output may be written to protected memory, and the display may be driven from the protected memory. A protection mechanism such as High-bandwidth Digital Content Protection (HDCP) may additionally be used to encrypt the graphical output prior to driving the display from the protected memory.

To prevent unauthorized copying of the graphical output, driving of the display from the protected memory may be discontinued if the graphical output lacks protection. In particular, upon detecting a lack of protection in the graphical output, a grace period associated with the lack of protection may be initiated, and the display may continue to be driven from the protected memory during the grace period. During the grace period, protection of the graphical output may be re-established, or the graphical output may be replaced with unprotected graphical output to avert a disruption in the display of the graphical output. If protection of the graphical output does not resume during the grace period, driving of the display from the protected memory may be discontinued. Instead, the display may be driven using substitute graphical output and/or the same graphical output at a lower resolution, or the graphical output may be used to drive a different display.

In some embodiments, the policy used to determine the grace period satisfies the most strict policy for a plurality of content providers for a given display. For example, an application for displaying bank records might require that no grace period be allowed on wireless displays, but a DVD player might allow more generous grace period. The hardware can generally enforce the most restrictive policy for a give display based only on whether memory was protected or could track and enforce at a finer grain. For example, different policies based could relate to different memory encryption keys (where each grace period policy of a hierarchy of policies has its own key). A given graphics operation would write its output using a key associated with the most restrictive key used for one of its inputs. Thus, a multi-key memory protection system would allow the display pipe to enforce that the policy indicated by the key for its memory.

Figure 1:
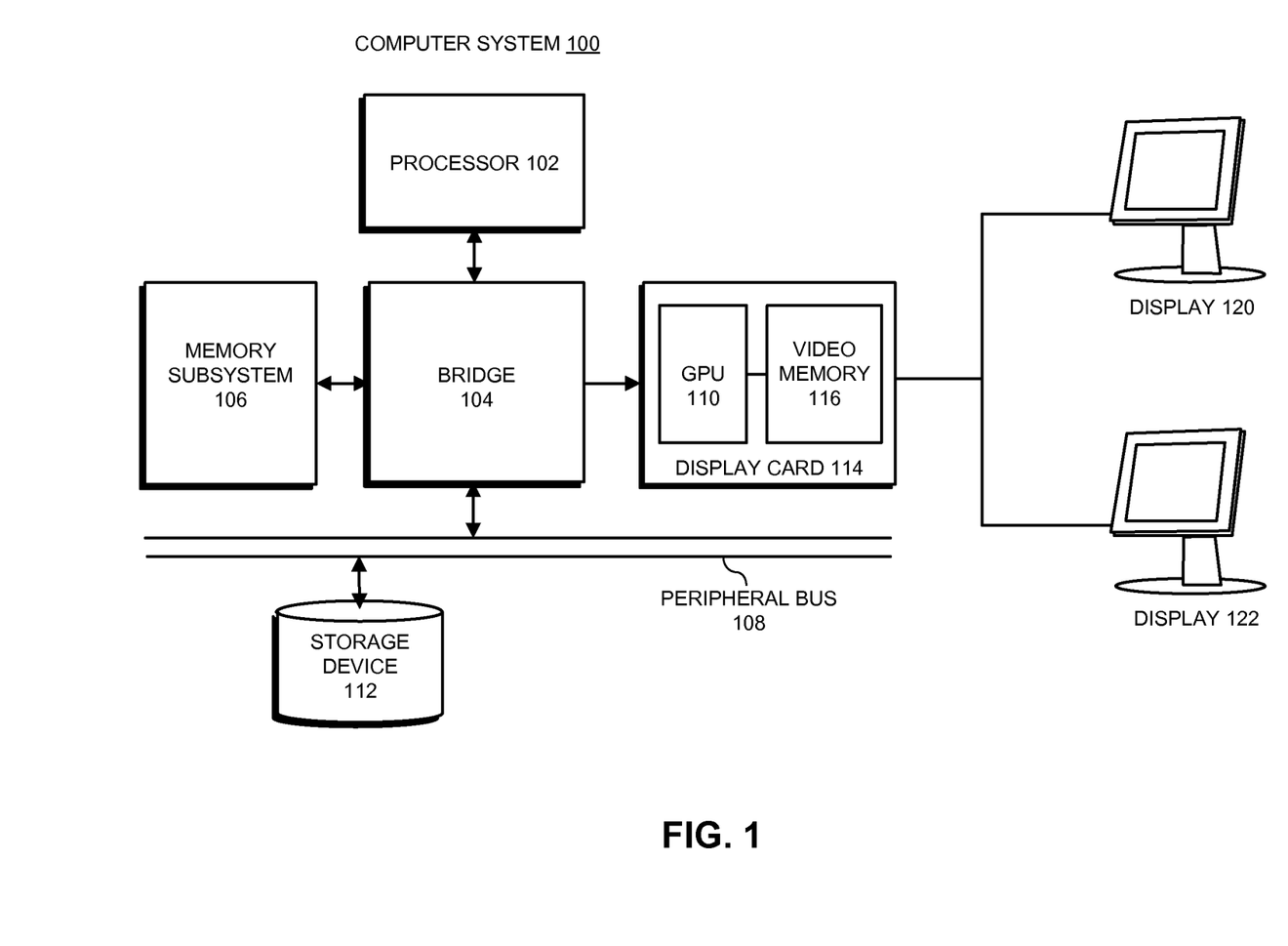
FIG. 1 shows a computer system in accordance with the disclosed embodiments.

FIG. 1 shows a computer system 100 in accordance with the disclosed embodiments. Computer system 100 may correspond to a personal computer, laptop computer, portable electronic device, workstation, and/or other electronic device capable of driving multiple displays 120-122. As shown in FIG. 1, computer system 100 includes a processor 102 that is coupled through a bridge chip 104 to a memory subsystem 106 containing semiconductor memory. Processor 102 may also communicate with a storage device 112 containing non-volatile storage through a peripheral bus 108 coupled to bridge chip 104. For example, storage device 112 may be a disk drive containing non-volatile magnetic storage.

In addition, processor 102 may communicate with displays 120-122 using a display card 114. More specifically, processor 102 is coupled to display card 114 through bridge chip 104. Display card 114 includes a graphics-processing unit (GPU) 110 that performs various graphical processing operations to produce video frames in one or more frame buffers located in video memory 116. The video frames may then be used to produce video streams that drive displays 120-122. For example, the video streams may be transmitted over a standardized video interface, such as a Digital Visual Interface (DVI), a High-Definition Multimedia Interface (HDMI) or a wireless link, to drive an external wired or wireless display (e.g., cathode ray tube (CRT) display, liquid crystal display (LCD), plasma display, organic light-emitting diode (OLED) display, surface-conducting electron-emitter display (SED), etc.) connected to computer system 100.

Those skilled in the art will appreciate that graphical output (e.g., video streams) generated by GPU 110 may be copied by an eavesdropper as the graphical output is sent across a video interface to an external display. To prevent copying of graphical output generated from protected (e.g., copyrighted) video content such as motion pictures, the graphical output may be encrypted using a protection mechanism such as High-bandwidth Digital Content Protection (HDCP). In general, protected content can include any content that the user or owner does not want to be sent in the clear. For example, a user's 100-year-old non-copyrighted manuscripts could be protected content. Also, protected content might also include information that is simply private. Moreover, it may be desirable to enforce different grace period policies for different types of content even on the same machine/display. For example, the grace period might be enforced as the shortest/strictest grace period of any given piece of protected content.

However, the eavesdropper may bypass the protection mechanism by exploiting glitches in the protection mechanism and/or vulnerabilities in untrusted software used to generate and/or display the graphical output. For example, many content providers do not require a protection mechanism such as HDCP to be engaged when playing on an internal display and, as a result, an eavesdropper may use an insecure application-programming interface (API) with computer system 100 to report that a window containing protected video content is on an internal (e.g., built-in) display while the window is actually located on an external display. The eavesdropper may then copy the video content while the video content is sent, unencrypted, over a video interface to the external display.

Figure 2:
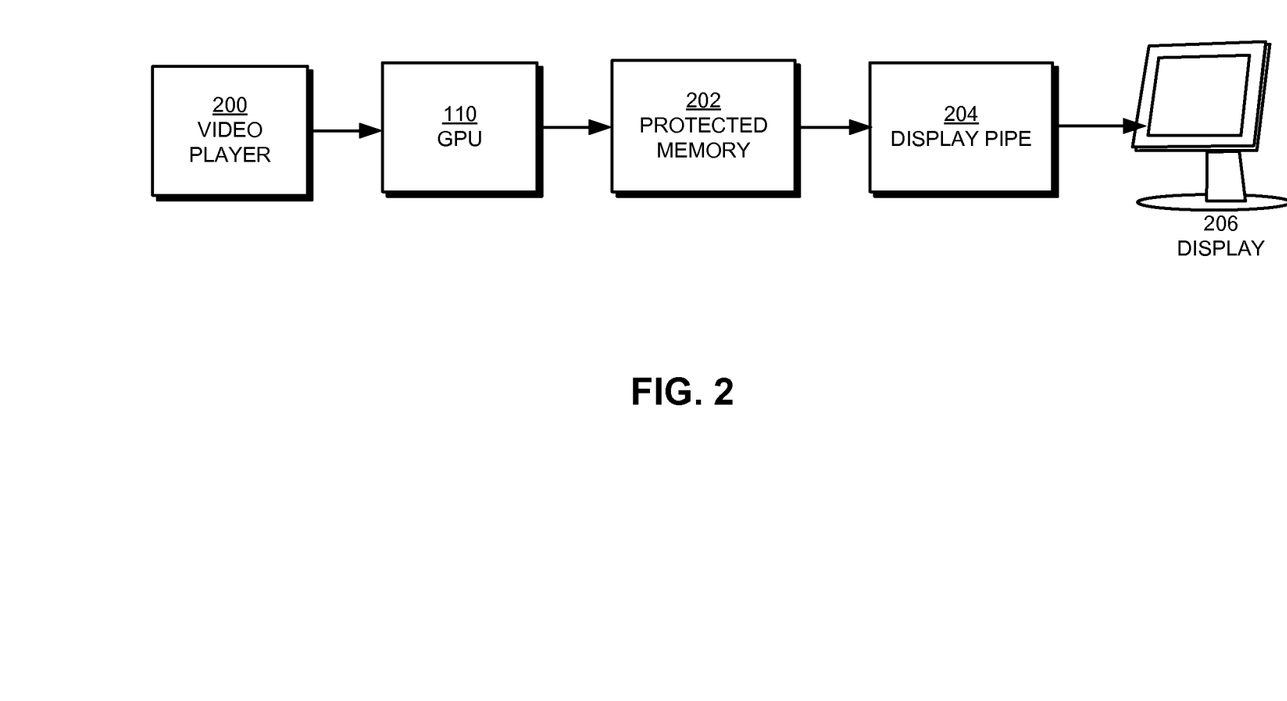
FIG. 2 shows a system for driving a display from a computer system in accordance with the disclosed embodiments.

In one or more embodiments, computer system 100 includes functionality to increase the security of protected video content during playback of the video content on an external display. As shown in FIG. 2, a video player 200 may communicate with GPU 110 to enable the rendering and/or display of graphical output from the protected video content. For example, video player 200 may negotiate a secure session with GPU 110 and/or another H.264 video decoder to decode compressed video content from a file and/or optical disc into a series of frames of graphical output. During the session negotiation, video player 200 may require that the frames be written to protected memory 202 (e.g., in video memory 116), to which access may be restricted through an encryption mechanism and/or access control.

Once the session is established, GPU 110 may generate the graphical output from the video content and write the graphical output to protected memory 202. To drive an external display 206 with the graphical output, a display pipe 204 coupled to display 206 (e.g., via a video interface) may pull the graphical output from protected memory 202 at the refresh rate of external display 206. (Although note that for self-refresh panels (and the like) the GPU may pull from memory at a different rate than the panel refresh rate.) As mentioned above, the graphical output may be encrypted prior to reading by display pipe 204 to prevent copying of the graphical output as the graphical output is transmitted over a video interface to display 206. After the graphical output is received by display 206, the encrypted graphical output may be decrypted before the graphical output is used to update display 206 to enable proper viewing of the graphical output on display 206.

Figure 3:
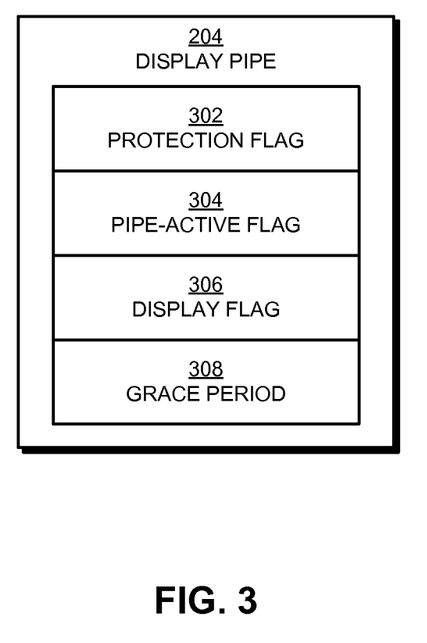
FIG. 3 shows a display pipe in accordance with the disclosed embodiments.

To further facilitate the secure transmission of the graphical output to display 206, display pipe 204 may be configured to discontinue driving of the external display from the protected memory if the graphical output lacks protection (e.g., is not encrypted). As shown in FIG. 3, display pipe 204 may be associated with a number of internal parameters, including a protection flag 302, a pipe-active flag 304, an internal display flag 306, and a grace period 308. (Note that flags might also indicate which type of internal connection, e.g., Embedded DisplayPort (eDP) versus Low-Voltage Differential Signaling (LVDS).) These parameters may be used by display pipe 204 to track and/or manage the driving of display 206 from computer system 100.

First, protection flag 302 may track the protection of the graphical output in protected memory 202. For example, protection flag 302 may indicate a graphical output is encrypted using HDCP and cleared if the graphical output is unencrypted. (For example, protection flag 302 might indicate which level of HDCP encryption is used (1.x versus 2.x) or the number of key bits used. Both of these pieces of information might be factors in deciding whether content could be played.) Next, pipe-active flag 304 may specify the status of display pipe 204. For example, pipe-active flag 304 may be set if display pipe 204 is actively transmitting to a display and cleared if display pipe 204 is inactive. Similarly, internal display flag 306 may identify display 206 as an internal or external display. For example, internal display flag 306 may be set if display 206 is an internal display (e.g., a built-in display for a laptop computer or portable electronic device) and cleared if display 206 is an external display (e.g., connected to computer system 100 via a video interface).

During video playback on video player 200, display pipe 204 may use protection flag 302, pipe-active flag 304, and internal display flag 306 to continue or discontinue driving display 206 from protected memory 202. First, display pipe 204 may be configured to drive display 206 from protected memory 202 only if protection flag 302 indicates that the graphical output is protected, pipe-active flag 304 indicates that display pipe 204 is inactive, and/or internal display flag 306 indicates that display 206 is an internal display. For example, display pipe 204 may continue driving display 206 from protected memory 202 independently of the protection of the graphical output if display 206 corresponds to an internal display. Alternatively, if GPU 110 never drives an internal display and/or drives an internal display that supports protection of graphical output, display pipe 204 may disregard internal display flag 306 during the driving of display 206. In some embodiments, the system allows internal displays to be used without encryption, but this can be disabled by fuses (or other specific mechanisms) based on the implementation. Moreover, in some embodiments, there is a secure mechanism which allows the upstream content-control system (e.g., the player) to know what the system will allow so that the player can configure itself appropriately. For example, the player may allow higher resolutions to play if later versions of HDCP are supported and can be required by the hardware.

However, if display 206 is an external display and the graphical output in protected memory 202 lacks protection (e.g., is unencrypted), display pipe 204 may discontinue driving display 206 from protected memory 202 to prevent unauthorized copying of the graphical output. More specifically, display pipe 204 may initiate a grace period 308 upon detecting a lack of protection in the graphical output. Grace period 308 may generally be enforced by a wide range of different mechanisms. For example, grace period 308 may be tracked by a timer and/or counter that decrements based on the elapsing of a period of time (e.g., a number of seconds), a number of frames of graphical output (e.g., transmitted by display pipe 204 to display 206), and/or a number of symbols (e.g., transmitted by display pipe 204 to display 206). In addition, the timer and/or counter may be securely controlled by hardware, a security fuse, microcode, and/or another secure mechanism associated with display pipe 204.

Upon initiating grace period 308, display pipe 204 may generate an interrupt that notifies GPU 110 and/or video player 200 of grace period 308 and/or the lack of protection in the graphical output. Alternatively, GPU 110 and/or video player 200 may obtain the status of the graphical output's protection and/or grace period 308 by periodically polling display pipe 204.

Furthermore, display pipe 204 may continue driving display 206 from protected memory 202 during grace period 308 to allow GPU 110 and/or video player 200 to recover from the lack of protection. For example, GPU 110 and/or video player 200 may use grace period 308 to re-establish the protection of the graphical output or switch to driving display 206 from unprotected memory. If protection of the graphical output resumes during grace period 308, display pipe 204 may reset the counter and/or timer associated with grace period 308 and continue driving display 206 from protected memory 202. As a result, grace period 308 may facilitate the uninterrupted viewing of the graphical output on display 206 during glitches and/or downtimes associated with the protection of the graphical output. The hardware may also provide counters to limit the grace periods before requiring the protected content to be regenerated. The goal here would be to prevent an attacker from using the grace period to send content in the clear by enabling and disabling HDCP in a pattern that allows all the unprotected content to be captured.

On the other hand, if protection of the graphical output does not resume during the grace period, display pipe 204 may discontinue driving display 206 from protected memory 202. Instead, display pipe 204 may drive display 206 from unprotected memory and/or a different display from protected memory 202. For example, display pipe 204 may drive display 206 from unprotected memory using the same graphical output at a lower resolution and/or substitute graphical output such as a gray area and/or a message describing the lack of protection in the graphical output (e.g., "HDCP Off"). Alternatively, display pipe 204 and/or another display pipe may drive another display from protected memory 202 if protection of the graphical output is enabled on the other display and/or if the other display corresponds to an internal display.

By configuring display pipe 204 to control the driving of display 206 from protected memory 202 and/or unprotected memory based on internal parameters (e.g., protection flag 302, pipe-active flag 304, internal display flag 306), the system of FIG. 2 may circumvent attacks that spoof the state of display pipe 204 (e.g., using insecure APIs) to gain access to unprotected graphical output transmitted from display pipe 204 to display 206. At the same time, grace period 308 may allow GPU 110 and/or display pipe 204 to recover from temporary lapses in the protection of graphical output written to protected memory 202 without interrupting the viewing experience of the graphical output on display 206. Finally, the driving of display 206 from unprotected memory and/or a different display from protected memory 202 if protection of the graphical output does not resume during grace period 308 may ensure that protected video content is only available on protected video outputs and that loss of protection is gracefully handled and on a per-display basis.

Figure 4:
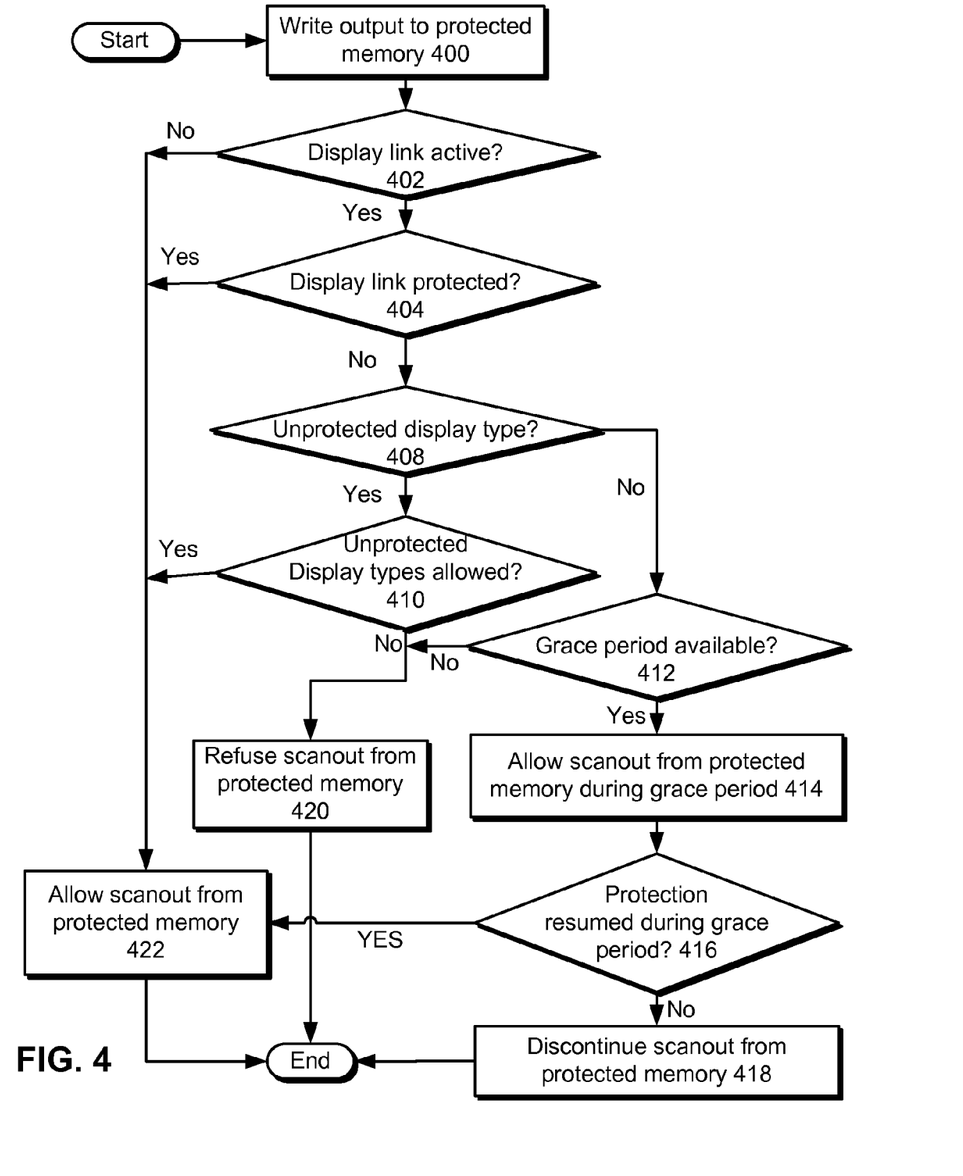
FIG. 4 shows a flowchart illustrating the process of driving a display from a computer system in accordance with the disclosed embodiments.

FIG. 4 presents a flowchart illustrating the process of driving a display from a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, graphical output is written to protected memory (operation 400). Next, the system determines whether the display link is active (operation 402). If not, the system does not allow the display pipe to scan out from either protected or non-protected memory (operation 422). In general, if the display link is inactive, the display link is treated like a protected display link. Note that pipeline transition to from off to unprotected may have different grace period characteristics than a transition associated with losing display link protection. Also note that current systems typically enforce protected memory for certain decoder functions. However, other graphics APIs (aside from decoding) could be extended to cause graphics output to go to protected memory. Such protected memory would also require protection whereupon such content would also require a protected link.

Otherwise, if the display link is active at operation 402, the system determines whether the display link is protected (operation 404). If so, the system allows the display pipe to scan out from protected memory (operation 422). Note that the graphical output, which is generated by the GPU, may be protected by encrypting the graphical output (e.g., using HDCP) in the display pipe prior to transmitting the graphical output to the display to prevent unauthorized copying of the graphical output by an eavesdropper.

If the display link is not protected at operation 404, the system determines whether the display is an unprotected display type (e.g., an internal display) as opposed to a protected display type (e.g., an external display) (operation 408). If so, the system determines whether unprotected display types are allowed (operation 410). If so, the system allows the display pipe to scan out from protected memory (operation 422). Otherwise, if unprotected display types (e.g., internal displays) are not allowed, the system refuses to allow the display pipe to scan out from protected memory (operation 420). For example, some unprotected display types, such as internal displays, may be not be allowed if internal displays are disabled, for example, through a fuse, a secure microcontroller on the system, or a policy.

If at operation 408, the system determines that the display is not an unprotected display type, the system determines whether a grace period is available, wherein the grace period is associated with the lack of protection of the graphical output (operation 412). If not, the system refuses to allow the display pipe to scan out from protected memory (operation 420).

Otherwise, if a grace period is available, the system continues to pull from the protected memory during the grace period (operation 414). Note that the grace period may, for example, correspond to an elapsed period of time, a number of frames, and/or a number of symbols tracked by the display pipe (or other similar features).

Next, the system determines whether protection of the graphical output resumed during the grace period (operation 416). For example, protection of the graphical output may resume if the GPU and/or display pipe recover from a glitch in the encryption of the graphical output. If protection of the graphical output resumed during the grace period, the system allows the display pipe to scan out from protected memory (operation 422) until a subsequent lack of protection in the graphical output is detected (operation 406). This entire process can be subject to limits enforced by hardware to avoid manipulating the enabling and disabling of HDCP to extract content during grace periods.

If protection of the graphical output does not resume during the grace period, the system discontinues the scan out from protected memory (operation 418). As an alternative, the display pipe may pull from unprotected memory using a substitute graphical output (e.g., gray area, message) and/or the same graphical output at a lower resolution, or a different display may be driven using the graphical output.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for driving a display from a computer system, comprising:
   storing display content in protected memory;
   determining an operating state of a display pipe that couples the protected memory to an external display, the display pipe being external to the display;
   when the display pipe is operating in a protected mode, driving, by the display pipe, the display content to the external display from the protected memory; and
   when the display pipe is operating in an unprotected mode:
   determining whether the display pipe has been operating in the unprotected mode for a period at least equal to a grace period;

when the display pipe has been operating in the unprotected mode for a period less than the grace period, driving, by the display pipe, the display content to the external display from the protected memory; and when the display pipe has been operating in the unprotected mode for a period longer than the grace period, preventing driving of the display content to the external display from the protected memory.

2. The method of claim 1, wherein the grace period corresponds to at least one of a period of time, a number of frames, and/or a number of symbols.

3. The method of claim 1, wherein a duration of the grace period is configurable and the grace period is disableable.

4. The method of claim 1, wherein the grace period satisfies a most strict grace period policy of a plurality of content providers for the display content.

5. The method of claim 1, further comprising, when the display pipe has been operating in unprotected mode for a period longer than the grace period, driving the display using a lower resolution replica of the display content.

6. The method of claim 1, further comprising, when the display pipe has been operating in unprotected mode for a period longer than the grace period, driving the display using gray content.

7. The method of claim 1, wherein the driving of the display content to the display from the protected memory without graphics output protection can be selectively disabled.

8. The method of claim 1, wherein the protected mode comprises transmission of the encrypted display content.

9. A system for driving an external display from a computer system, comprising:
a graphics-processing unit (GPU) configured to write display content to protected memory;
a processor configured to determine whether a display pipe is operating in a protected mode; and
the display pipe coupled to the external display, the display pipe configured to:
when the display pipe is operating in a protected mode, drive the display content to the display from the protected memory; and
when the display pipe is operating in an unprotected mode and when the display pipe is actively transmitting date to the display:
determine whether the display pipe has been operating in the unprotected mode for a period at least equal to a grace period;
when the display pipe has been operating in the unprotected mode for a period less than the grace period, drive, by the display pipe, the display content to the display from the protected memory; and
when the display pipe has been operating in the unprotected mode for a period longer than the grace period, prevent driving of the display content to the display from the protected memory.

10. The system of claim 9, wherein, when the display pipe has been operating in unprotected mode for a period longer than the grace period, the display pipe is further configured to drive the display using a lower resolution replica of the display content.

11. The system of claim 9, wherein, when the display pipe has been operating in unprotected mode for a period longer than the grace period, the display pipe is further configured to drive the display using gray content.

12. The system of claim 9, wherein the display pipe is further configured to continue driving the display content to the display from the protected memory during a grace period associated with a lack of protection in the display content actively transmitted by the display pipe.

13. The system of claim 12, wherein a duration of the grace period is configurable and the grace period is disableable.

14. The system of claim 12, wherein the grace period corresponds to at least one of a period of time, a number of frames, and/or a number of symbols.

15. The system of claim 12, wherein there is a limitation on a number of resumptions from a grace period.

16. The system of claim 12, wherein the grace period satisfies a most strict grace period policy of a plurality of content providers for the display content.

17. A non-transitory computer-readable storage medium storing instructions that when executed by a computer cause the computer to perform a method for driving a display from a computer system, the method comprising:
storing display content in protected memory;
determining an operating state of a display pipe that couples the protected memory to an external display;
when the operating state of the display pipe indicates the display pipe is operating in a protected mode, driving, by the display pipe, the display content to the display from the protected memory; and
when the operating state of the display pipe indicates the display pipe is operating in an unprotected mode:
determining whether the display pipe has been operating in the unprotected mode for a period at least equal to a grace period;
when the display pipe has been operating in the unprotected mode for a period less than the grace period, driving, by the display pipe, the display content to the display from the protected memory; and
when the display pipe has been operating in unprotected mode for a period longer than the grace period, preventing driving of the display content to the display from the protected memory.

18. The computer-readable storage medium of claim 17, further comprising, when the display pipe has been operating in unprotected mode for a period longer than the grace period, driving the display using the display content at a lower resolution.

19. The computer-readable storage medium of claim 17, the method further comprising:
upon detecting a lack of protection in the display content actively transmitted by the display pipe, continuing to drive the display from the protected memory during a grace period associated with the lack of protection in the display content actively transmitted by the display pipe.

20. The computer-readable storage medium of claim 19, wherein the grace period corresponds to at least one of a period of time, a number of frames, and/or a number of symbols.

21. A method for driving a display from a computer system, comprising:
storing display content in protected memory;
determining an operating state of a display pipe that couples the protected memory to an external display;
when the operating state indicates the display pipe is driving an allowed display type, driving, by the display pipe, the display content to the display from the protected memory;
when the operating state of the display pipe indicates the display pipe is operating in a protected mode, driving, by the display pipe, the display content to the display from the protected memory; and when the operating state of the display pipe indicates the display pipe is operating in an unprotected mode, preventing driving of the display content to the display from the protected memory.

22. The method of claim 21, wherein the driving of the display content to the display from the protected memory for the allowed display type can be selectively disabled.

* * * * *